(12) United States Patent
Shyu et al.

(10) Patent No.: US 7,570,436 B2
(45) Date of Patent: Aug. 4, 2009

(54) TWO PIECE TYPE OPTICAL LENS

(75) Inventors: San-Woei Shyu, Taipei (TW); Chi-Hsiung Wang, Taipei (TW)

(73) Assignee: E-Pin Optical Industry Co., Ltd., Taipei (TW)

(*) Notice: Subject to any disclaimer, the term of this patent is extended or adjusted under 35 U.S.C. 154(b) by 0 days.

(21) Appl. No.: 11/711,889

(22) Filed: Feb. 28, 2007

(65) Prior Publication Data

US 2008/0204897 A1    Aug. 28, 2008

(51) Int. Cl.
*G02B 13/18*    (2006.01)
*G02B 9/06*    (2006.01)

(52) U.S. Cl. .................. 359/717; 359/794

(58) Field of Classification Search .......... 359/717, 359/794
See application file for complete search history.

(56) References Cited

U.S. PATENT DOCUMENTS 6,813,095 B2 * 11/2004 Chen ................. 359/717
6,888,686 B2 *  5/2005 Do .................... 359/717

* cited by examiner

*Primary Examiner*—Scott J Sugarman
(74) *Attorney, Agent, or Firm*—Muncy, Geissler, Olds & Lowe, PLLC

(57) ABSTRACT

An optical lens, especially an optical lens for mobile phones or image sensors such as CCD (Charge Coupled Device) or CMOS (Complementary Metal Oxide Semiconductor) is formed by a two-piece lens featuring high performance, minimized total length and low cost.

4 Claims, 4 Drawing Sheets

TWO PIECE TYPE OPTICAL LENS

BACKGROUND OF THE INVENTION

The present invention relates to a two piece type optical lens, especially to an optical lens for mobile phones or image sensors such as CCD (Charge Coupled Device) or CMOS (Complementary Metal Oxide Semiconductor) formed by a two piece of lens with features of high performance, minimized total length and low cost.

Along with advanced technology, electronics become more compact and multifunctional. Besides digital still cameras, PC (personal computer) cameras, network cameras and mobile phones, even persona digital assistants are equipped with image capturing devices such as lens. For meeting requirements of easy-carrying and humanization design, the image capturing device not only need to have good imaging quality but also need to have compact volume and lower cost so as to extend applications thereof. Especially for applications on mobile phones, the requirements above mentioned are much more important.

There are various materials available for producing conventional spherical ground glass lens. Moreover, the spherical ground glass lens is better for correcting chromatic aberration so that it is adapted widely. Yet it's difficult to correct aberrations such as spherical aberration or astigmatism for the spherical ground glass lens with smaller F Number and larger field angle. In order to improve above shortcomings of conventional spherical ground glass lens, aspherical plastic lens or aspherical molded glass lens is applied to the image capturing devices available now so as to obtain better imaging quality. For example, refer to the lenses disclosed in U.S. Pat. No. optical image pick-up lens, U.S. Pat. No. 6,031,670, wide-angle lens or Japanese patent P2001-183578A, imaging lens etc. However, the total length of the above image capturing devices is still too long. For example, in the lens set disclosed in Japanese patent P2001-183578A, imaging lens, the distance d between a firs surface of the first lens element and a second surface of the second lens element is no less than 0.9f ( $d \geq 0.9f$, f is an effective focal length of an optical lens assembly according to the present invention ) so that the volume of the lens can't be reduced . Neither does the cost. Such kind of design can't satisfy compact and light requirements of electronics. Furthermore, applications of such lens are limited severely, especially on mobile phones.

SUMMARY OF THE INVENTION

It is therefore a primary object of the present invention to provide a two piece type optical lens that includes a first lens element with positive refractive power, a second lens element with positive refractive power, an IR cut-off filter and an image sensor arranged along an optical axis in sequence from an object side. The first lens element and the second lens element are both meniscus aspherical molded glass lens while a convex surface of the first lens element is on the object side and a convex surface of the second lens is on the image side. Moreover, the two piece type optical lens satisfies following conditions: $0.2f \leq d < 1f$, $0 < |R3| \leq 100f$, $0.01 < |f2|/|f1| < 3$, and $20 \leq Vd \leq 85$, wherein f is an effective focal length of the whole lens; d is the distance between a convex surface on the object side of the first lens element and a convex surface on the image side of the second lens element; R3 is a radius of curvature of the object side of the second lens element, f1 is an effective focal length of the first lens element, f2 is an effective focal length of the second lens element and Vd is Abbe's number of the first lens element as well as the second lens element. Thereby a two piece type optical lens with high resolution and minimized total length is formed.

It is another, object of the present invention to provide a single piece type optical lens in which a pre-aperture is disposed on the optical lens. An aperture stop is arranged on front of the convex surface on the object side so as to effectively minimize total length of the lens for increasing applications of the lens.

DETAILED DESCRIPTION OF THE PREFERRED EMBODIMENT

Figure 2:
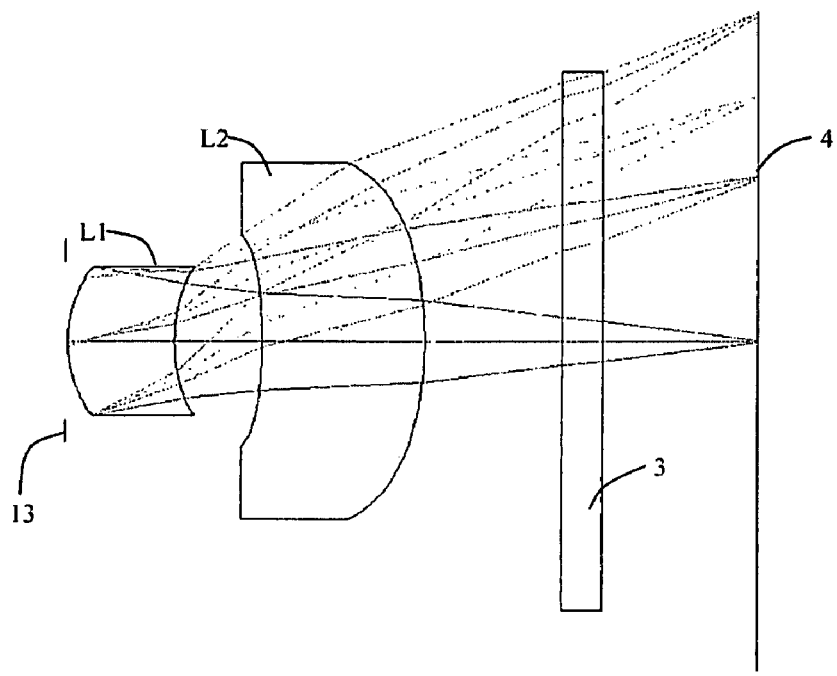
FIG. 2 is a schematic drawing of a light path of an embodiment according to the present invention.
Figure 3:
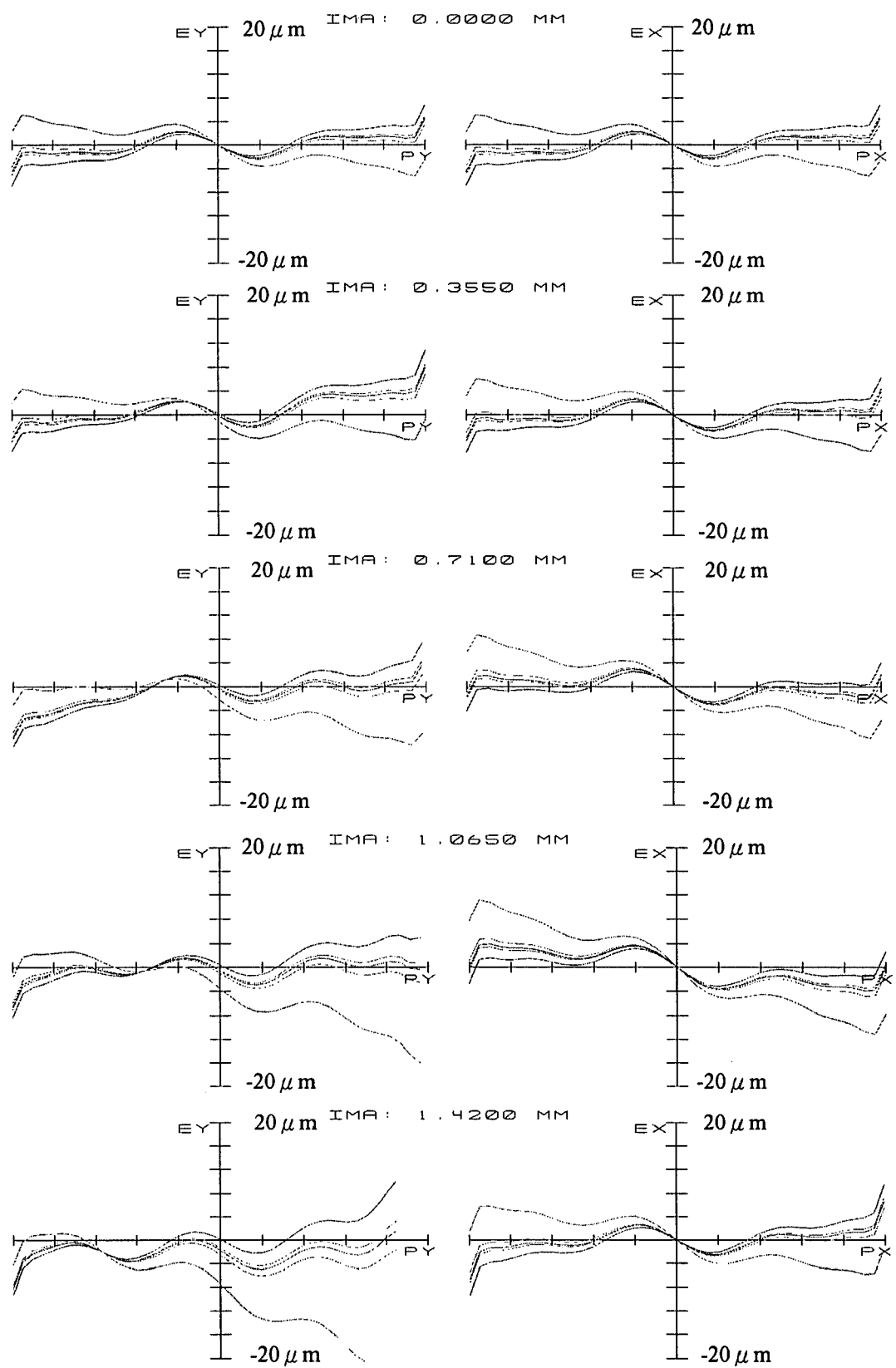
FIG. 3 is a transverse ray fan plot in different field (true image size 0, 0.355, 0.71, 1.065, 1.42 mm) of an embodiment according to the present invention.
Figure 4:
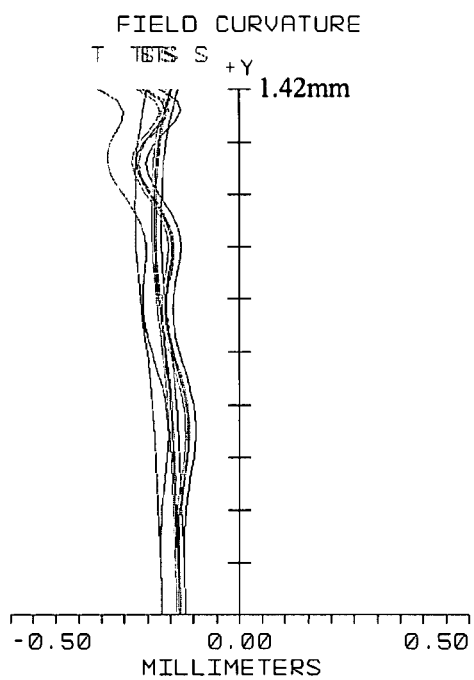
FIG. 4 shows field curvature of an image of an embodiment according to the present invention.
Figure 5:
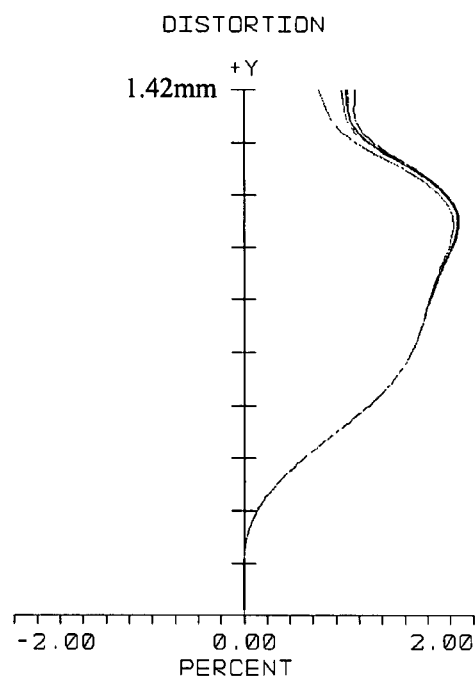
FIG. 5 shows distortion of an image of an embodiment according to the present invention.
Figure 6:
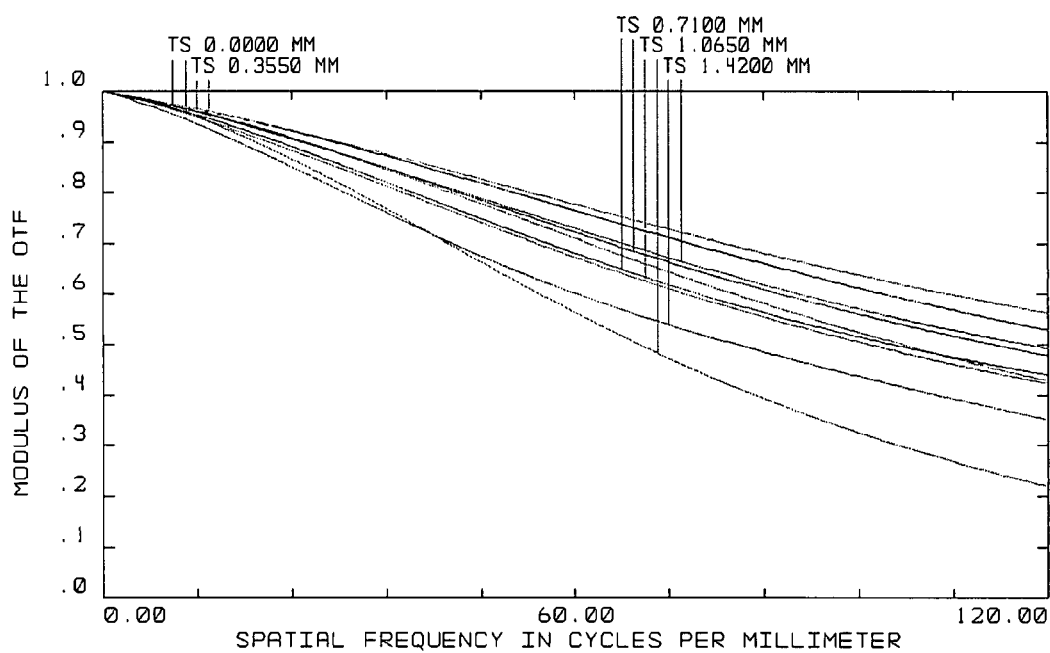
FIG. 6 shows modulation transfer function of an embodiment in five different field (true image size 0, 0.355, 0.71, 1.065, 1.42 mm) corresponding to spatial frequency ranging from 0 to 120 LP/mm.
Figure 7:
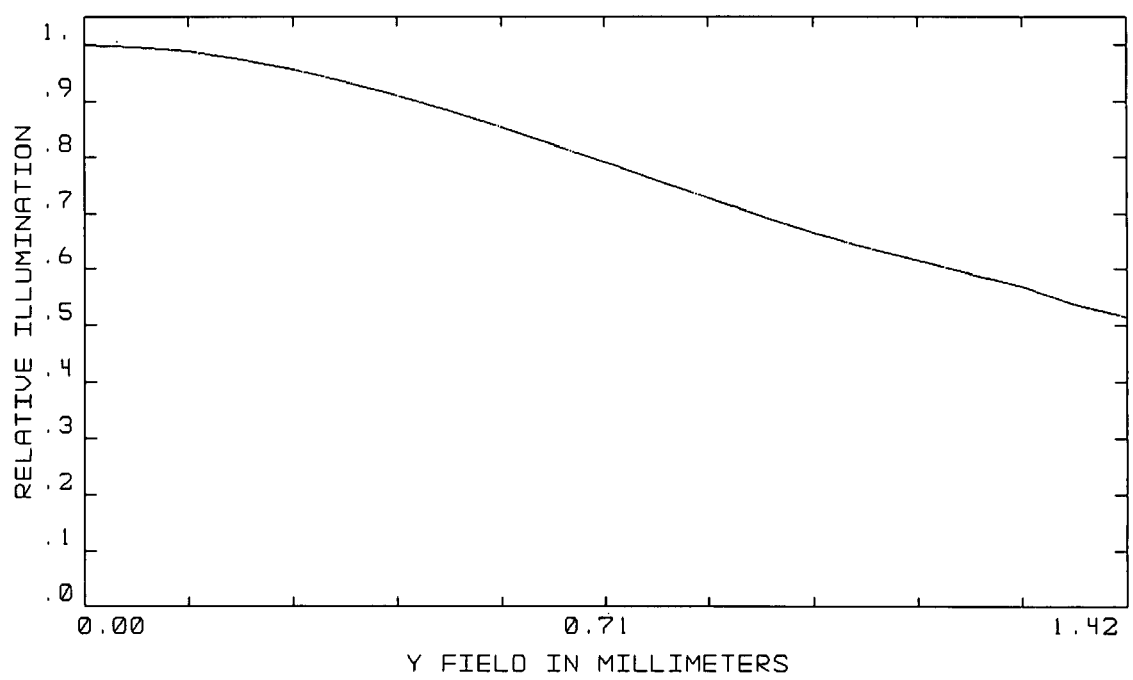
FIG. 7 is a graph showing relative illumination generating by full field toward zero field of an embodiment according to the present invention.

A two piece type optical lens according to the present invention includes a first lens element with positive refractive power L1, a second lens element with positive refractive power L2, an IR(infrared) cut-off filter 3 and an image sensor 4 arranged along an optical axis in order from an object side. While imaging, firstly light passes the first lens element L1, the second lens element L2 and the IR cut-off filter 3, then an image is formed on a sensing surface 41 of the image sensor 4, as shown in FIG. 2.

Figure 1:
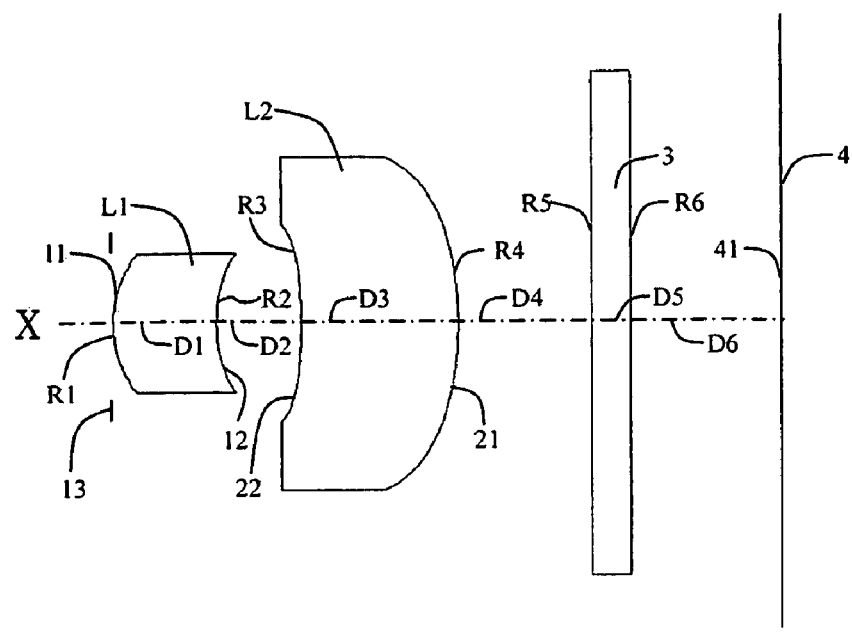
FIG. 1 is a schematic drawing of an optical structure of an embodiment according to the present invention.

The first lens element L1 is a meniscus molded glass lens whose convex surface 11 is on the object side while at least one of the convex surface 11 and a concave surface 12 is an aspherical surface. The second lens element L2 is a meniscus molded glass lens whose convex surface 21 is on the image side while at least one of the convex surface 21 and a concave surface 22 is an aspherical surface. Moreover, a pre-aperture is disposed on the optical lens of the present invention and aperture stop 13 is arranged on the convex surface 11 of the object side of the first lens element L1 as shown in FIG. 1 & FIG. 2.

The two piece type optical lens satisfies following expressions:

$$0.2f \leq d < 1f;$$

$$0 < |R3| \leq 100f;$$

$$0.01 < |f2|/|f1| < 3; \text{ and}$$

$$20 \leq Vd \leq 85;$$

wherein f is an effective focal length of the whole optical lens;

d is the distance between the convex surface 11 on the object side of the first lens element L1 and the convex surface 21 on the image side of the second lens element L2;

R3 is a radius of curvature of the object side of the second lens element L2;

f1 is an effective focal length of the first lens element L1;

f2 is an effective focal length of the second lens element L2; and

Vd is Abbe's number of the first lens element L1 as well as the second lens element L2.

In accordance with the structure mentioned above, the optical lens according to the present invention has features of high resolution and minimized total length so that the optical lens has smaller volume and lower cost, both improving applications of the optical lens.

Refer to list one, the list includes data of surface number (#) in order from the object side, type of each surface, the radius of curvature R (mm), the on-axis surface spacing D (mm) and materials that the lens made of.

List one

| Surf # | Type | R | D | |
|---|---|---|---|---|
| (OBJ) | STANDARD | ∞ | ∞ | |
| 1 (STO) | EVENASPH | 0.6208799 | 0.39 | N-SK57 |
| 2 | EVENASPH | 0.8876672 | 0.32 | |
| 3 | EVENASPH | −3.580208 | 0.6 | N-SK57 |
| 4 | EVENASPH | −1.993002 | 0.5 | |
| 5 | STANDARD | ∞ | 0.145 | BK7 |
| 6 | STANDARD | ∞ | 0.5702734 | |
| (IMG) | STANDARD | ∞ | | |

List 2: aspheric coefficients of each optical surface

| Conic K | Coeff on A | Coeff on B | Coeff on C | Coeff on D | Coeff on E | Coeff on F | Coeff on G |
|---|---|---|---|---|---|---|---|
| 2.5582827 | −1.601611 | 38.318041 | −565.9495 | 4036.5911 | −11467.87 | 0 | 0 |
| 3.272712 | 4.2482342 | −7.529695 | 69.402686 | −199.7694 | 0 | 0 | 0 |
| 0 | −0.514621 | 0.6430439 | −2.74182 | 15.105232 | 0 | 0 | 0 |
| 0.0621767 | −0.178999 | 2.2080681 | −10.38657 | 83.666404 | −185.3604 | 209.50246 | −96.05938 |

Conic and Aspherical Surface Formula: $Z = ch^2/\{1+[1-(1+K)c^2h^2]^{1/2}\} + Ah^4 + Bh^6 + Ch^8 + Dh^{10} + EH^{12} + Fh^{14} + Gh^{16}$ wherein c is a curvature, h represents height of lens, K is a conic constant, A, B, C, D, E, F, G respectively are 4th, 6th, 8th, 10th, 12th, 14th, 16th order aspherical coefficient.

The first lens element L1 and the second lens element L2 of the embodiment are made of N-SK57 type molded glass lens while the IR cut-off filter 3 is made of BK7 optical glass with thickness of 0.145 mm.

When the effective focal length f of the whole optical lens according to the present invention is 2.07268 mm and distance between the convex surface 11 (object side) of the first lens element L1 and the convex surface 21 (image side) of the second lens element L2 is 1.31 mm, a relational expression $0.2f \leq d < 1f$ is satisfied. When the radius of curvature of the concave surface 22 (object side) of the second lens element L2 R3 is −3.580208 mm, the condition of $0 < |R3| \leq 100f$ is satisfied. When the effective focal length of the first lens element L1 f1 is 2.284 mm, the effective focal length of the second lens element L2 f2 is 6.719 mm and $|f2|/|f1|=2.942$, the condition of $0.01 < |f2|/|f1| < 3$ is satisfied. When the Abbe's number of the first lens element L1 as well as the, second lens element L2 Vd is 59.6, the condition of, $20 \leq Vd \leq 85$ is satisfied. Refer from FIG. 3 to FIG. 7, together with the list one and the list two, it is learned that the total length of the optical lens according to the present invention is 2.52527 mm.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A two piece type optical lens, in order from the object side towards the image side, comprising:

an aperture stop;

a first lens element with positive refractive power that is a meniscus aspherical lens having a convex surface on an object side, wherein the first lens element is made of molded glass;

a second lens element with positive refractive power that is a meniscus aspherical lens having a convex surface on an image side, wherein the second lens element is made of molded glass;

an IR(infrared) cut-off filter; and an image sensor arranged along an optical axis in order from the object side;

wherein following expressions are satisfied:

$0.6f \leq d < 0.9f$;

$0.5 < |R3| \leq 10f$;

$0.9 < |f2|/|f1| < 3$; and $20 \leq Vd \leq 85$;

wherein f is an effective focal length of the optical lens, d is the distance between the object side of the first lens element and the image side of the second lens element, R3 is a radius of curvature of the object side of the second lens element, f1 is an effective focal length of the first lens element, f2 is an effective focal length of the second lens element and Vd is Abbe's number of the first lens element as well as the second lens element.

2. The two piece type optical lens as claimed in claim 1, wherein at least one of the convex surface and a concave surface of the meniscus first lens element is an aspherical surface.

3. The two piece type optical lens as claimed in claim 1, wherein at least one of the convex surface and a concave surface of the meniscus second lens element is an aspherical surface.

4. The two piece type optical lens as claimed in claim 1, wherein the IR(infrared) cut-off filter is made of glass with thickness of 0.145 mm.

* * * * *